United States Patent
Baumann

[11] 3,880,191
[45] Apr. 29, 1975

[54] ROTARY MULTIPORT THROTTLING VALVE

[76] Inventor: Hans D. Baumann, 29 Villa Dr., Foxboro, Mass. 02035

[22] Filed: Mar. 21, 1974

[21] Appl. No.: 453,650

[52] U.S. Cl............................. 137/625.32; 251/298
[51] Int. Cl............................................ F16k 47/02
[58] Field of Search ....... 251/298, 301; 137/625.31, 137/625.32, 625.47

[56] References Cited
UNITED STATES PATENTS
1,221,702  4/1917  Douglas.......................... 251/301 X
3,224,424  12/1965  Mennicken et al......... 137/625.31 X Primary Examiner—Arnold Rosenthal

[57] ABSTRACT

A rotary type throttling valve particularly suitable for fluid pressure actuated pressure regulating service providing means of pressure reduction for gaseous or liquid media with a minimum of rotary motion, having capability of tight shut-off in the closed position by extensive overlapping of a perforated inner cylinder cage against an outer cylindrical cage, and wherein said cages provided multiple small parallel and in series acting flow passages for important fluid noise reduction.

7 Claims, 5 Drawing Figures

ROTARY MULTIPORT THROTTLING VALVE

BACKGROUND OF THE INVENTION

The field of art of my invention relates to that of valves for controlling fluid flow and subject to automatic regulation by actuator means either powered by the line fluid itself (usually referred to as "self-contained regulators") or by auxiliary energy sources, such as compressed air coming from a controlling instrument (usually referred to as "automatic control valves"). More particularly, my invention relates to rotary throttling valves having eccentric rotating closing means. Rotary throttling valves are well-known in the state of the art, particularly in the form of ball valves and butterfly valves, including devices with eccentric rotating closing means.

A typical example of a more advanced type of this class of valves is illustrated in U.S. Pat. No. 3,623,696. However, such construction requires a relatively large motion (usually 50 to 60 percent rotation) to withdraw the valve member sufficiently to fully open the flow passage. Such large motion, requiring long actuator stroke, is not difficult to overcome by means of pneumatically operated valve actuators. However, such a long stroke makes the valve completely unsuitable for use with short stroke fluid actuated devices, i.e. unsuitable for use as self-contained regulators. Furthermore, such present state of the art devices generate substantial fluid noise, due to the relatively large circular flow passage, internal pressure recovery zones, and single stage throttling mechanism inherent in the design. Another disadvantage common with prior art devices is the complicated means of positioning of the valve members, i.e. reciprocating cylinder motion is converted into rotary action external of the valve body and then transmitted by means of long shafts, requiring expensive and cumbersome bearings and seals, to the rotating inner valve member, valve plugs, or vanes.

BRIEF SUMMARY OF THE INVENTION

My invention overcomes these and other disadvantages in that it provides for a rotary type throttling action, in which the flow passages consist of parallel series of holes or slots in both, an outer and inner cylinder. All series of openings line up completely (between the stationary outer and the rotating inner cylinder) when in the fully open valve position, but are off-set from each other and overlap completely with a solid walled surface when closed, after the cylindrical inner cage has rotated in a cam-like fashion around an excentrically located shaft and is pressed on to the inner wall of the outer cage. The required rotary motion is relatively small (10° to 14°), since it is only necessary for the inner cage circumference to travel somewhat more than the height of one individual slot or hole. This makes the valve very suitable to be rotated by fluid power actuated and spring loaded diaphragm motors having very limited stroke capabilities (usually between one-eighth and one-half inch).

Another advantage of my invention is the fact, that the rotating inner cage can be directly connected to the reciprocating actuator stems, eliminating expensive and back-lash producing external rotary shaft connections and seals.

Furthermore, my invention is completely sealed, in that the valve mechanism is inserted through one of the valve ports and therefore dispenses completely with the common bonnet openings and stem packing, thereby increasing not only the reliability of the device, but providing in addition a very low cost means of manufacture.

Yet, another advantage of my invention is the capability of high pressure reduction without generating noise capability of high pressure reduction without generating noise as an objectional by-product. Noise produced by the turbulence caused by pressure reducing throttling action can be greatly diminished by providing a large number of small flow passages (instead of the more common single circular port passage) and, in addition, by providing pressure reduction in series, causing a substantial reduction in throttling velocity, the major cause of fluid generated noise.

While dynamic plug forces in conventional self-contained regulators diminish with increasing valve stroke (and thereby providing "negative feed-back," i.e. creating more error in the controlled variable such as downstream pressure), my invention has for an important objection the capability to compensate for this decrease in the plug force "tending to open" the valve through the use of an enlarged downstream area (2nd stage) of the inner rotating cylinder, which when subjected to steadily increasing pressure with increase in stroke, provides additional torque tending to open the valve and assist the actuator (therefore, adding "positive feed-back" and contributing to a closer control of the process variable).

Yet, still another advantage of my invention can be found in the means of adjustment for the precise location of the rotating inner cylinder in respect to the stationary outer cylinder by means of adjustable outer shaft bearings, therefore enabling full compensation for variations in manufacturing tolerances and - later on - wear of the moving parts after actual use in service.

These and other advantages of my invention will become apparent from a study of the following detailed description and drawings.

DETAILED DESCRIPTION OF THE INVENTION

Figure 1:
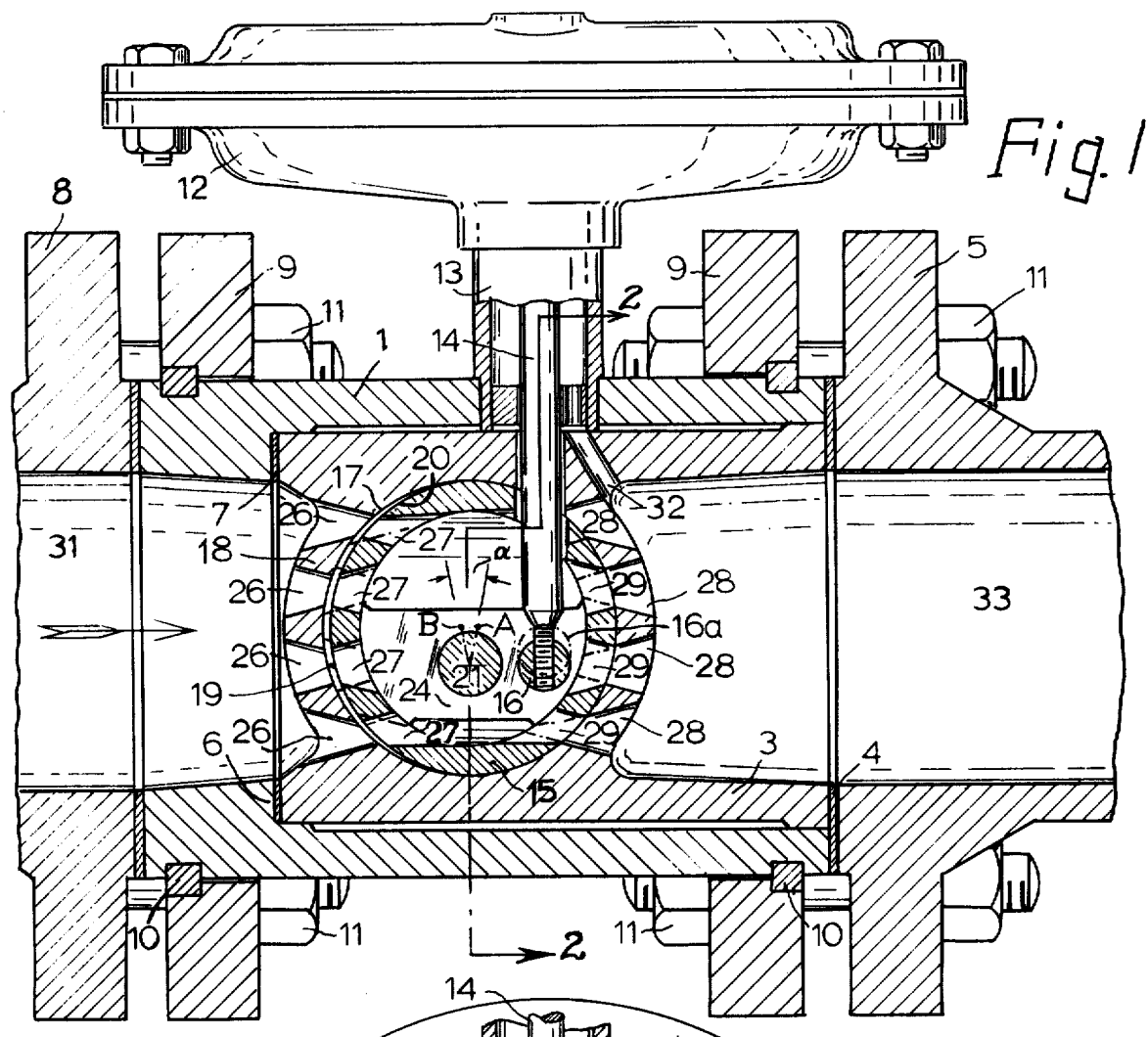
FIG. 1 is a vertical sectional view of a preferred embodiment of my invention shown in the fully open position, wherein the flow passages consist of a number of parallel slots.

The invention rotary multiport valve consist of a tubular housing 1, made in the preferred form as shown in FIG. 1 from steel bar stock.

Housing 1 contains a sliding insert assembly 3, which is held in place by the pressure exerted through the gasketed portion 4 of outlet line flange 5 and which is sealed against an embutment 6 of housing 1 through a gasket 7. Housing 1 is firmly mated to line flanges 5 and 8 through a pair of slip-on flanges 9, keyed to housing 1 by split rings 10 and sets of bolts and nuts 11.

A conventional diaphragm actuating device 12 of known and prior art is fastened to housing 1 by means of a tubular extension 13, which is brazed or welded to the latter and which contains a reciprocating valve stem 14, connecting the inner movable portion of said actuating device 12 with a rotating inner cage 15 using a tiltable pin 16 as coupling means. Said inner rotating cage 15 is located in a circular opening 17 of a stationary outer cage 18 located essentially perpendicular to the valve axis and having its center at B in FIG. 1.

Furthermore, cage 15 has a turned or ground outer periphery, which right-hand radius essentially matches the radius of opening 17 originating from center B. However, the left-hand radius is machined with slight off-set to the right and having its center at A, thereby leaving (in the "open" valve position shown in FIG. 1) a parallel gap 19, equivalent to the longitudenal distance B - A, between the left-hand radius 20 of cage 15 and the inner wall of bore 17.

Figure 3:
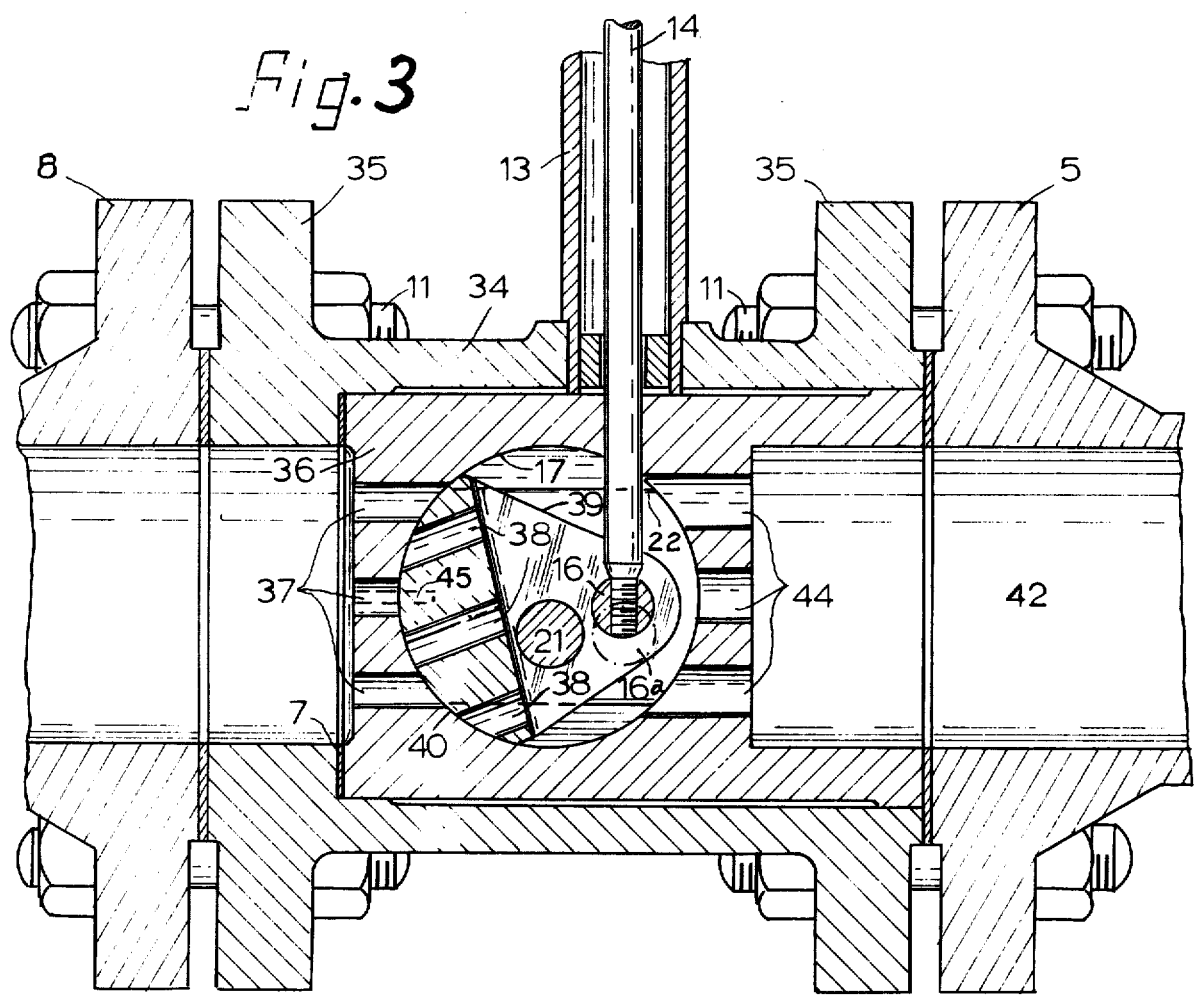
FIG. 3 is a vertical sectional view of a modified form of my invention illustrated in the closed valve position and utilizing a segmented inner cage with a number of parallel holes as flow passages.
Figure 4:
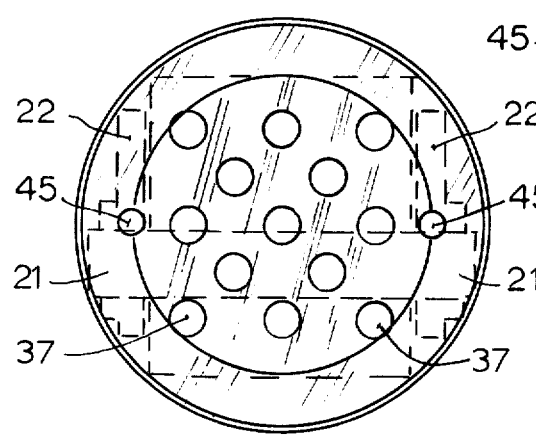
FIG. 4 shows the frontal or side view of the sliding insert assembly of my invention as illustrated in FIG. 3.
Figure 5:
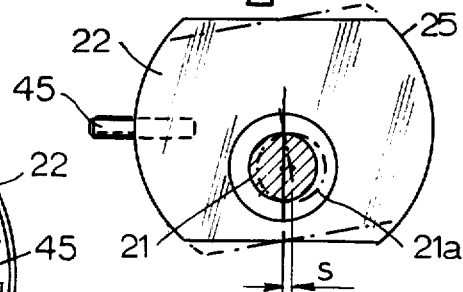
FIG. 5 is a side view of the adjustable shaft bearing.

A shaft 21, being supported on each side of cage 15 by a pair of shaft bearings 22, provides an eccentric pivot point and bearing arrangement for cage 15 through cast-on internal bearings 23 connected to the outer cylindrical shell of cage 15 by ribs 24. Said shaft bearings 22, more closely shown in FIG. 5, are externally guided and closely but tiltably held in bore 17 by segmental circular walls 25. A slight rotation of shaft bearing 22 within bore 17 (as indicated by dotted lines in FIG. 5) effectively displaces the shaft center and thereby the location of the inner rotating cage 15 by a distance S along the longitudenal valve axis. Such minute adjustment of the final location of cage 15 in respect to bore 17 can compensate for machining tolerances and - after service - of wear and can aid in the accomplishment of tight shut-off as explained later on. A final selected position of both shaft bearings 22 is secured by a pin 45 interconnecting with the front end of the stationary outer cage 18, as shown in FIG. 3 and 4.

The front end of outer stationary cage 18 contains a number of horizontal and parallel slots 26 which are taperedly enlarged away from bore 17, in order to provide low hydrualic resistance of the entering fluid. The slots 26 are exactly in line with an equal number of parallel slots 27 contained within the outer periphery of inner cage 15 in the "wide open" position of the valve shown in FIG. 1.

Figure 2:
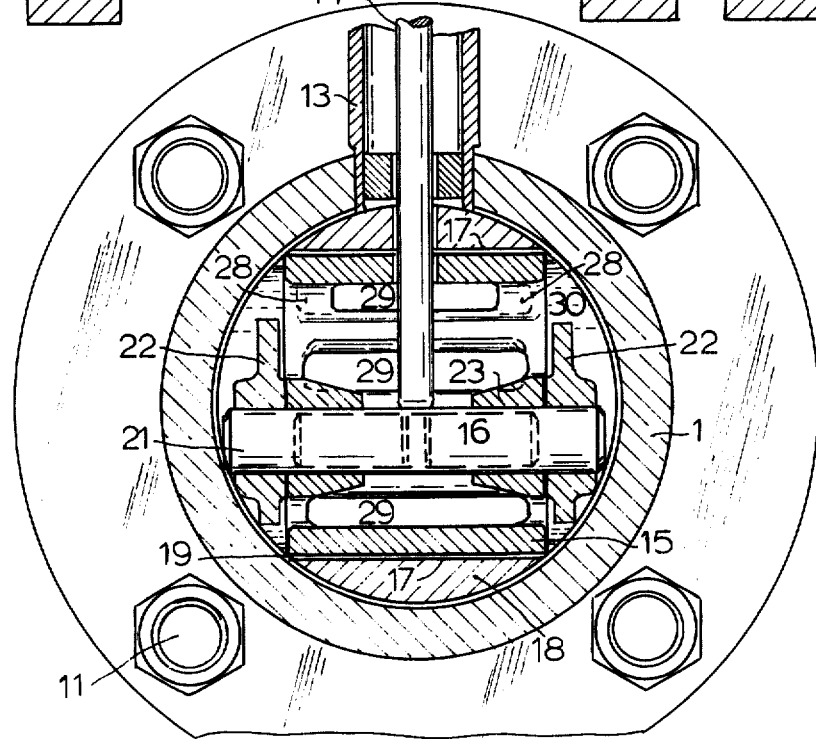
FIG. 2 is a transverse section of the invention taken on lines 2 — 2 of FIG. 1.

The outlet side of stationary cage 18 has an equal number of slots 28 cooperating and aligning with an equal number of slots 29 located within the right-hand radial periphery of inner cage 15. Outlet slots 28 and 29 are substantially larger in cross-section when compared to inlet slots 26 and 27, in order to compensate for volume expansion of a passing gaseous fluid following initial pressure reduction through inlet slots 26 and 27. Furthermore, as shown in this particular illustration of FIG. 2, one of the outlet slots 29 is less wide in comparison to the corresponding downstream slot 28, in order to provide an "off-balance" area, which, when subjected to the rapid build-up in intermediate pressure in cavity 30 following partial valve opening, will exert a torque in the further direction of valve opening, thereby assisting the valve actuator and providing "positive feed-back" for more accurate control.

Any upward lift of valve stem 14 causes a proportional rotation of inner cage 15 around valve shaft 21, causing center A to approach location B and to narrow gap 19 in proportion until tight contact is established between left-hand radial surface 20 of cage 15 and the wall of inner bore 17. During the same movement, all slots 27 are displaced downwards and all slots 29 are displaced upwards in respect to the stationary slots 26 and 28, until finally there is complete overlap between each solid wall section of the outer cage 18 and each slot of the rotating inner cage 15, as indicated by dotted lines, causing the tight shut-off for the fluid entering through up-stream pipe 31.

Any intermediate valve stem position causes partial overlap of both slot pairs 26 - 27 and 28 - 29, thereby providing two throttling restrictions in series, resulting in reduced fluid turbulence, noise, and wear. Sliding friction responsible for actuator hysteresis and wear of the seatring surfaces is avoided, since contact between the periphery of inner cage 15 and bore 17 exists only in each respective end position of the valve lift, i.e. when the valve is closed or (as shown) fully open.

An internal sensing hole 32 connects the actuating chamber of diaphragm actuator 12 with the downstream cavity 33, in order to sense the final downstream pressure in case of use by my invention as a self-contained pressure regulator.

The maintenance of my invention is quite simple. The complete sliding insert assembly 3 consisting of outer cage 18, inner cage 15, shaft 21, pin 16, and shaft bearings 22 can be removed for inspection or repair by slipping it out of housing 1 after disconnection of valve stem 14 and line flange 5.

FIG. 3 shows an alternate embodiment of my invention, consisting of a housing 34 with cast-on flanges 35 connecting with line flanges 5 and 8. Such a cast housing made, for example, of cast-iron is more practical for larger valve sizes. The flow passages in the outer cage 36 of this embodiment consist of a number of equally spaced holes 37, communicating with identically spaced holes 38 in a segmented inner cage 39, pivoting around a shaft 21 in identical manner as previously described following reciprocating movement of valve stem 14. All holes 38 overlap with solid wall portions of outer cage 36 in the shown "closed" position, with outer radial wall 40 in firm contact against the inner wall of bore 17. However, in the wide open position, i.e. pin 16 in position 16a, there is complete alignment between the two sets of holes 37 and 38, and full passage for the fluid is assured. A second set of holes 44 provides means of communication for the fluid with pipe line 42. The utilization of holes instead of slots is preferred with the utilization of materials for the inner or outer cage which are not readily castable, such as hardenable chrome alloys. Otherwise, the functional aspects of this modified embodiment of my invention are as previously described.

It will be understood, that the invention is not to be limited to the specific construction or arrangement of parts shown but that they may be widely modified within the invention defined by the claims. For example, insert assembly 3 may be installed into housing 1 from the inlet end of said housing instead from the outlet end and could abut a stop shoulder near the outlet port without departing from the scope of the attached claims.

The preferred embodiment of my invention has been described in a form where the rotating inner cage is moved by a reciprocating valve stem, which presents a more convenient and economical solution. Nevertheless, it should be understood, that a similar purpose can be achieved without departing from the spirit of my invention and the scope of the attached claims by extending shaft 21 through the wall of housing 1 and connecting it directly to rotary actuating means, after having shaft 21 suitably keyed to the inner cage 15 or 39.

I claim:
1. Rotary multiport throttling valve comprising:
   a. a tubular housing;
   b. an inlet and outlet end formed in said housing, said inlet and outlet ends adapted to be coupled to a pipe line;
   c. a straight-cylindrical passage formed in said housing and extending from the outlet end of said housing towards a stop shoulder near the inlet of said housing;
   d. a cylindrical insert assembly removably placed within the straight-cylindrical passage abutting the stop shoulder within said housing;
   e. a cylindrical bore extending perpendicular through the whole width of an outer cage, forming the shell of said insert assembly;
   f. an inner rotating cage, having a partial or complete cylindrical wall located within and cooperating with the perpendicular cylindrical bore of said outer cage;
   g. a pair of shaft bearings located and retained within said perpendicular bore and abutting said rotating inner cage on either end;
   h. a shaft extending throughout and between both shaft bearings and providing support for said rotating inner cage;
   i. a set of symmetrically spaced flow passages, located within the abutting front end of said outer cage and providing communicating openings between the inlet end of said housing and the said perpendicular bore;
   k. a set of symmetrically spaced flow passages penetrating through a portion of the cylindrical wall of said rotating inner cage, and wherein said flow passages line up with those contained within said outer cage at a certain rotary inner cage position labeled as "the fully open valve position," and wherein the radial distance between each set of flow passages is at least equal to the radial width of each flow passage;
   1. means to actuate and to rotatively position said rotating inner cage suitably connected to said housing.

2. A valve of claim 1, wherein the axis of the shaft interconnecting said shaft bearing and said rotating inner cage is vertically off-set in its location towards the center of the perpendicular cylindrical bore of said outer cage, and wherein the center for the radius of a semi-circle, describing one outer wall of the rotating inner cage, is slightly off-set in its horizontal relationship to the axis of said cylindrical bore of the outer cage.

3. A valve of claim 1, wherein said symmetrically spaced flow passages consist of a number of parallel slots.

4. A valve of claim 1, wherein said symmetrically spaced flow passages consist of a number of holes.

5. A valve of claim 1, wherein said rotating inner cage has a tubular outer wall extending over the full circumference, and wherein said inner cage is provided with a cavity interconnecting said flow passages located within the semi-circled wall portion of the inner cage facing the inlet end, with a similar set of passages located within the semi-circular wall portion of the inner cage facing the outlet end of said housing, and wherein the wall of the outer cage facing the outlet end contains an equally spaced set of flow passages.

6. A valve of claim 5, wherein the cross-sectional area of one or more outer cage flow passages facing the outlet end of said housing is larger than the cross-sectional area of the corresponding flow passage of the rotating inner cage.

7. A valve of claim 1, wherein the shaft bearings, having a circular outer guide segment and a shaft opening which is located off-set towards the center of said circular outer guide segment, can be rotatively positioned to shift the center of said shaft opening and thereby the location of said rotating inner cage in respect to the perpendicular cylindrical bore of the outer cage.

* * * * *